United States Patent

[11] 3,599,408

| [72] | Inventors | Walter Scott Craven;<br>George R. Brown, both of Route #1,<br>Cleveland, Ga. 30528 |
|---|---|---|
| [21] | Appl. No. | 779,747 |
| [22] | Filed | Nov. 29, 1968 |
| [45] | Patented | Aug. 17, 1971 |

[54] RIDING GREENS MOWER
8 Claims, 10 Drawing Figs.

[52] U.S. Cl. .................................................. 56/14.4,
180/26, 192/93, 56/15.2
[51] Int. Cl. .................................................. A01d 35/24
[50] Field of Search ........................................ 56/6, 7, 25,
25.4, 26; 180/26, 42, 53; 192/93

[56] References Cited
UNITED STATES PATENTS

| 1,672,250 | 6/1928 | Felton | 56/26 |
| 2,191,135 | 2/1940 | Roth | 56/7 |
| 2,299,150 | 10/1942 | Kennedy | 180/42 |
| 2,588,721 | 3/1952 | Heller | 180/53 UX |
| 2,677,224 | 5/1954 | Stegeman | 56/7 |
| 2,879,859 | 3/1959 | Swisher | 180/26 |
| 2,860,474 | 11/1958 | Cyr | 180/26 X |
| 2,899,793 | 8/1959 | Swisher | 180/26 X |
| 2,968,902 | 1/1961 | Brown | 180/26 |
| 2,996,867 | 8/1961 | Williams | 56/7 |
| 3,061,031 | 10/1962 | Packard | 180/26 |

FOREIGN PATENTS

| 619,931 | 3/1949 | Great Britain | 180/26 |

Primary Examiner—Louis G. Mancene
Assistant Examiner—J. A. Oliff
Attorney—D. A. N. Chase ABSTRACT: A riding mower having a driven wheel unit which is also steerable through 360°. The prime mover is mounted on the main frame and is stationary therewith, power being delivered to the driven wheel unit on the same vertical axis about which the unit is rotated to steer the mower. A grass catcher is employed which has an opening through which a load of clippings is discharged by a reciprocable pusher plate within the catcher. The cutter assembly is raised to an elevated, inoperative position by a winch drum powered by a friction drive connection with another of the wheel units of the mower.

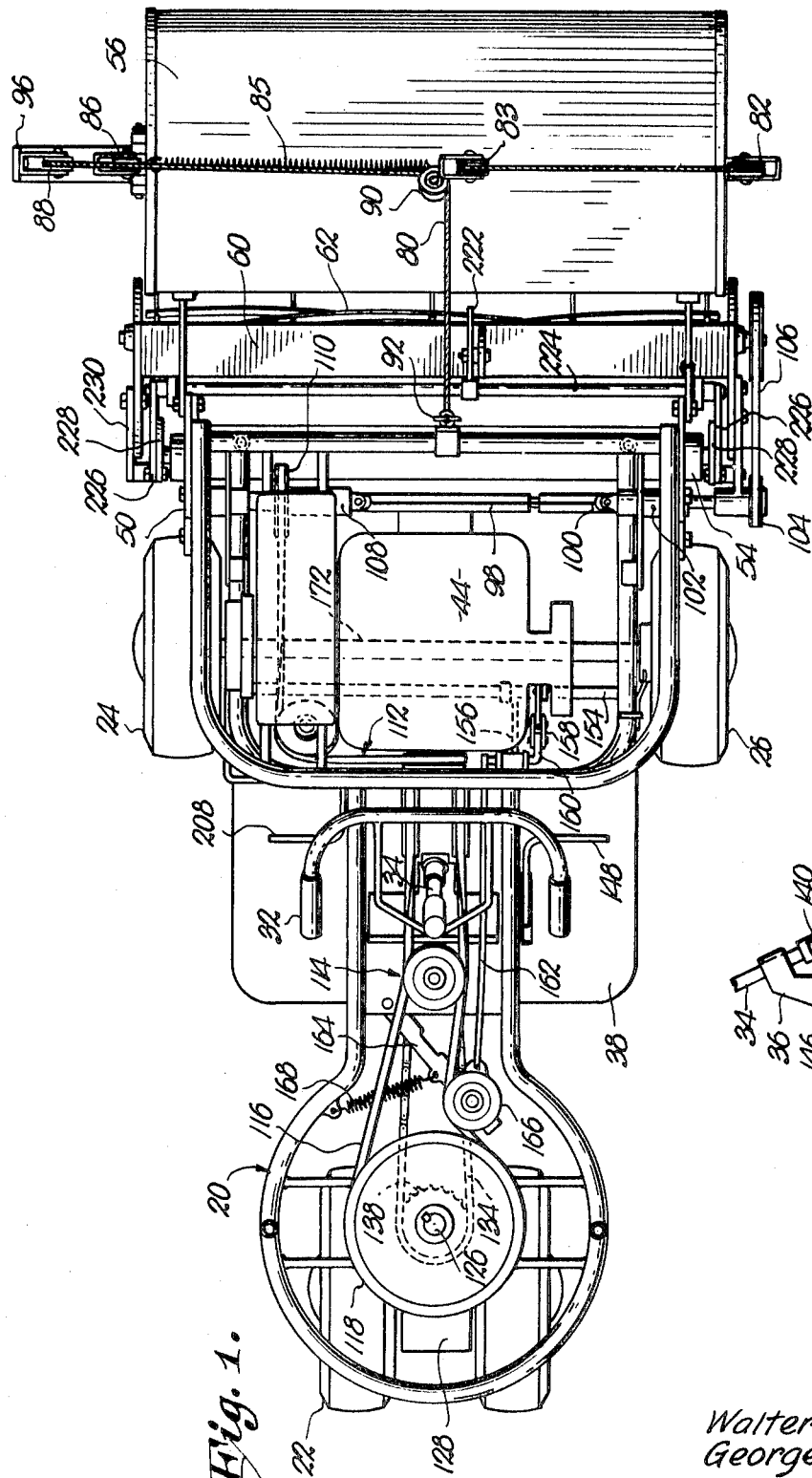

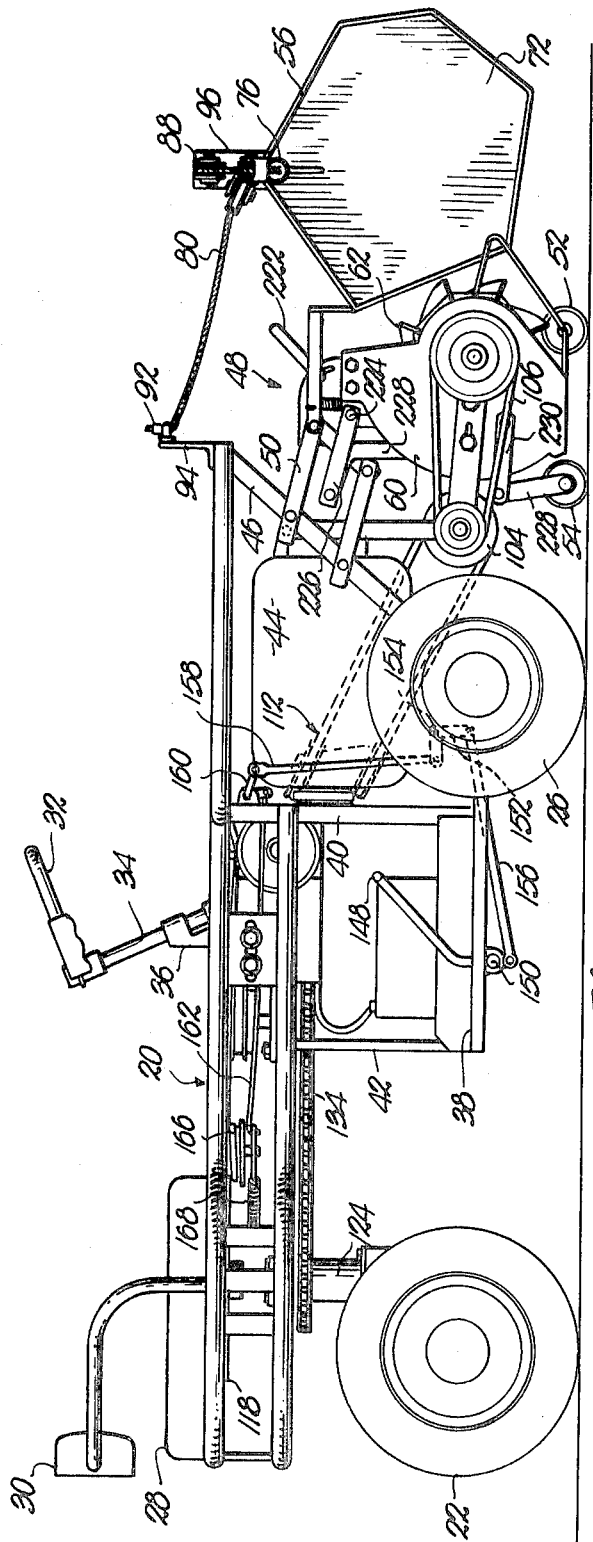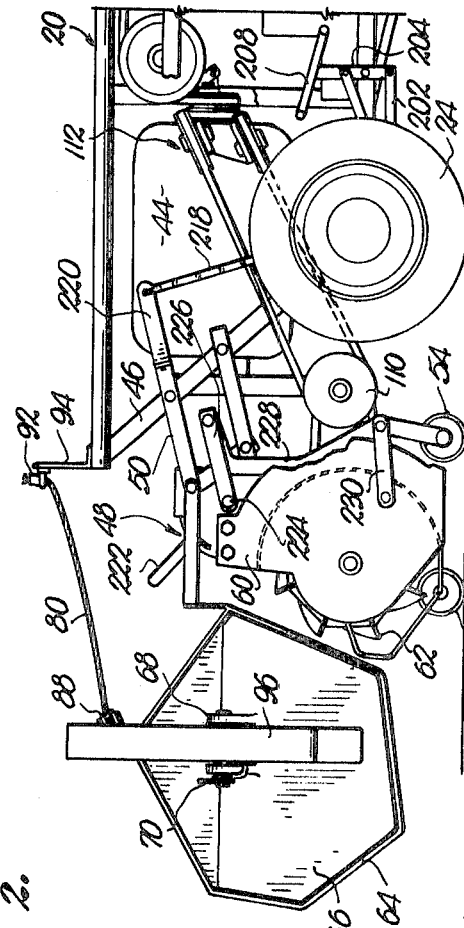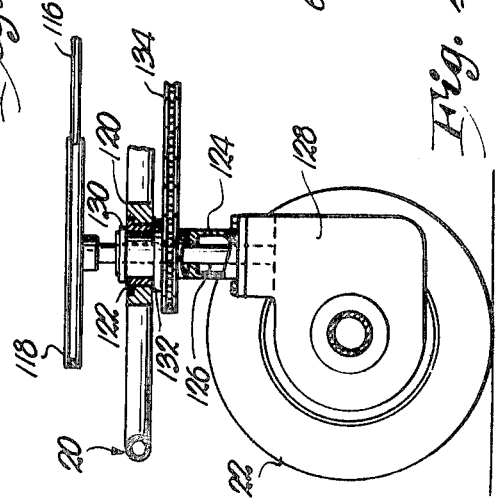
INVENTORS
Walter Scott Craven
George R. Brown
BY Schmidt, Johnson, Hovey, Williams & Bradley
ATTORNEYS PATENTED AUG 17 1971
3,599,408
SHEET 3 OF 3
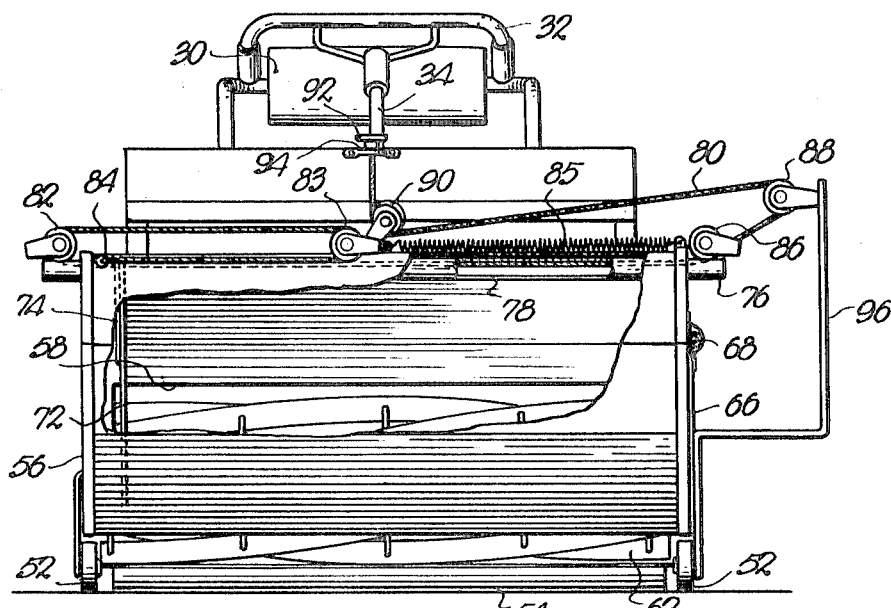
Fig. 5.
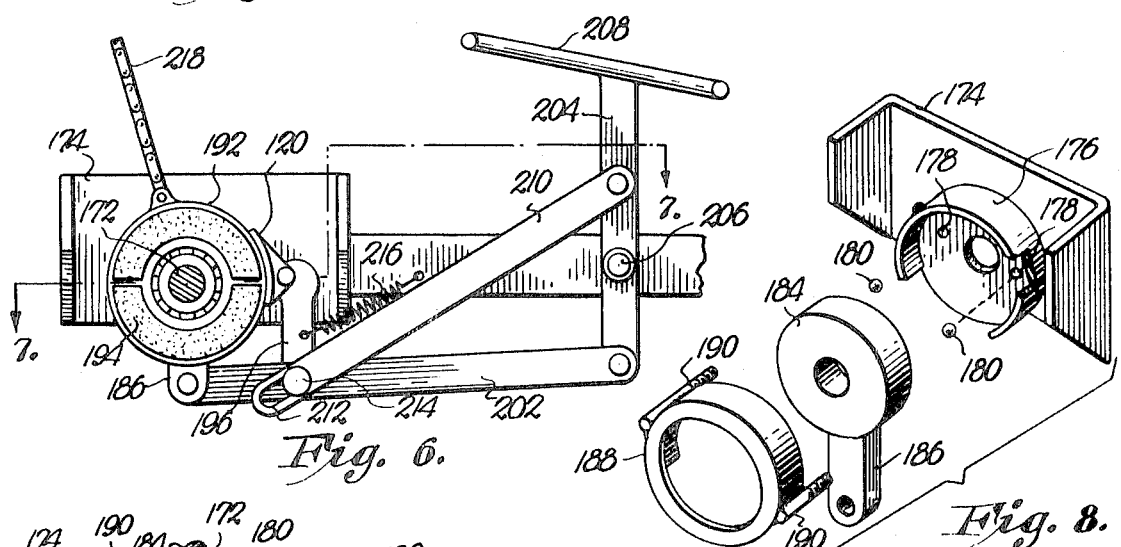
Fig. 6.
Fig. 7.
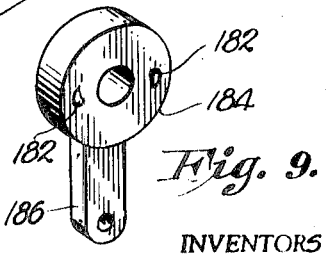
Fig. 8.
Fig. 9.
INVENTORS
Walter Scott Craven
George R. Brown
BY *Schmidt, Johnson, Hovey,
Williams & Bradley*
ATTORNEYS

RIDING GREENS MOWER

Heretofore, it has commonly been the practice to mow golf course greens with hand-mowing equipment. The greens of championship courses oftentimes undulate and have a variety of slopes and contours, in addition to the fact that the grass is cut quite short and must be uniform over the entire playing surface. For these reasons, a green must be skillfully cut and it is required that any mowing apparatus utilized be capable of maximum maneuverability and flexibility in operation.

It is, therefore, the primary object of this invention to provide power driven mowing apparatus having superior maneuverability and flexibility of operation, but which also has a relatively uncomplex drive and steering train especially adapting the apparatus for the mowing of golf course greens or other applications where maximum maneuverability and a relatively lightweight frame are required.

As a corollary to the foregoing object, it is a specific aim of the invention to provide apparatus as aforesaid having a wheel unit which is driven by a prime mover stationary with the main frame of the apparatus, but which is also steerable through 360°.

Furthermore, it is an important object of this invention to provide mowing apparatus having a grass catcher from which a load of clippings may be discharged without removing the catcher from the apparatus.

Yet another important object of the invention is to provide a means of raising the cutter assembly of the mowing apparatus to an elevated, inoperative position utilizing the power available at one of the rotating wheels of the apparatus.

In the drawings:

FIG. 1 is a top plan view of the mower of the present invention, the seat and backrest being removed for clarity;

FIG. 2 is a side elevational view of the mower;

FIG. 3 is a fragmentary, side elevational view looking at the opposite side as compared with FIG. 2;

FIG. 4 is an enlarged, detail view of the driven wheel unit showing the drive and steering connections thereto;

FIG. 5 is a front elevational view of the mower, a portion of the catcher being broken away to reveal details of construction;

FIG. 6 is an enlarged, side elevational, detail view of the winch and associated components;

FIG. 7 is a horizontal sectional view taken along line 7—7 of FIG. 6;

FIG. 8 is a perspective, exploded view of certain components of the winch;

FIG. 9 is a perspective, detail view showing the opposite side of the lift activator seen in FIG. 8; and FIG. 10 is a detail view showing the lower end of the steering post and associated gear and sprocket linkage.

The mower of the present invention is shown in full in FIGS. 1, 2 and 5, and has a main frame 20 which is supported upon a double-wheel unit 22 at the rear of the apparatus and a pair of single-wheel units 24 and 26 spaced forwardly from the rear unit 22. A seat 28 for the operator of the mower is mounted on the main frame 20 at the rear thereof above the wheel unit 22, and a backrest 30 is also secured to the frame 20 for the comfort of the operator. The mower is steered by a handlebar 32 rigid to an inclined steering post 34 that is rotatably supported by a mount 36. A floor plate 38 is carried beneath the main frame 20 behind the front wheel units 24 and 26 and is connected to the main frame 20 by front and rear vertical frame members 40 and 42.

The prime mover of the mower is illustrated diagrammatically at 44 and is mounted between and above the front wheel units 24 and 26. The main frame 20 is provided with a pair of laterally spaced, diagonal frame members 46 forwardly of the front wheel units 24 and 26, the frame members 46 serving to support a reel-type cutter assembly 48. The cutter assembly 48 is joined to the diagonal members 46 by a pair of parallel linkages 50 which are pivotally secured to the respective members 46. The cutter assembly 48 rides along the ground on a pair of front wheels 52 and a rear roller 54, the latter being vertically adjustable to control the cutting height.

A catcher 56 for grass clippings and the like is mounted ahead of cutter assembly 48 and is open at its rear to present an entrance 58 through which clippings from assembly 48 are directed. It should be understood that the partial enclosure 60 which forms a part of the cutter assembly 48 directs clippings forwardly over the top of the rotatable reel 62, and thus directs such clippings into the catcher 56 through the entrance 58.

The catcher 56 is elongated in configuration and extends from side-to-side in front of the reel 62 of cutter assembly 48, as is clear in FIGS. 1 and 5. One end of the catcher 56 presents a discharge opening 64 that is normally closed by a gate 66 (FIG. 3) mounted for swinging movement about a horizontal axis by a hinge 68. The gate 66 is held closed by a spring 70. The opposite end of the catcher 56 is closed by a pusher plate 72 that is suspended by a hanger member 74, the latter having its upper end disposed within a laterally extending, horizontal pipe 76 at the top of the catcher 56. The underside of the pipe 76 is provided with a longitudinal slit 78 which permits the hanger member 74 to depend from the pipe 76, but retains the upper end of member 74 within the tubular bore thereof. A rope 80 extends through the pipe 76 and is tied to the upper end of the hanger member 74, one end of the rope 80 extending from the left end (as viewed in FIG. 5) of pipe 76 around a fixed pulley 82 and a shiftable pulley 83, the rope then being doubled back to a tie point 84 adjacent the fixed pulley 82. The shiftable pulley 83 is secured to one end of an elongated return spring 85 that overlies the catcher 56 and extends longitudinally thereof, the other end of the spring 85 being anchored at the right end of the catcher 56 as viewed in FIG. 5. The opposite end of the rope 80 extends from the right end of pipe 76 around pulleys 86, 88 and 90 and terminates at a handle 92 which is retained by a bracket 94 on the front end of the main frame 20. The pulley 88 is secured to an operating arm 96 which extends outwardly and upwardly from the gate 66.

In order to drive the reel 62 and yet permit raising and lowering of the cutter assembly 48, a jackshaft comprising two relatively telescoped shaft assemblies 98 and 100 is mounted between the prime mover 44 and the reel 62. A universal joint 102 forms a part of shaft assembly 100, the outer end of the latter being provided with a pulley 104 which forms a part of a belt and pulley assembly 106 that transfers the drive to the reel 62. A universal joint 108 forms a part of the shaft assembly 98, the outer end portion of which is provided with a pulley 110 comprising the driven component of a belt and pulley drive 112 that operably couples the output shaft of prime mover 44 with the shaft assembly 98. The inner shaft portions of the two shaft assemblies 98 and 100 have mating male and female ends of square cross section to permit relative longitudinal movement of the two shaft assemblies while maintaining a drive coupling therebetween. It should be understood that the drive train to the reel 62 would normally be provided with a clutch for selectively decoupling the reel 62 from the prime mover 44, but a clutch for this purpose is not illustrated in the drawings in the interest of clarity.

A transmission in the form of a belt and pulley drive 114 transfers power from the prime mover 44 to the rear wheel unit 22, the drive 114 including a final drive belt 116 which is trained around a driven element comprising a pulley 118 rotatable about a vertical axis. The main frame 20 is provided with a crossmember 120 (FIG. 4) in which a sleeve bearing 122 is mounted to receive the upper end of a tubular support member 124 that extends downwardly from frame member 120. A drive component in the form of a vertical shaft 126 is coaxial with support member 124 and extends completely therethrough, the pulley 118 being keyed to the upper end of the shaft 126. The lower end of the shaft 126 is operably coupled with a differential 128 which transfers the drive to the two wheels of the rear wheel unit 22. Only the housing of the differential 128 is illustrated in the drawings since any conventional differential gear arrangement may be utilized.

Vertical movement of the support member 124 is prevented by a retainer 130 overlying the bearing 122, and a collar 132 beneath the bearing 122. Rotation of the support member 124 independently of the shaft 126 is effected by a drive chain 134 which is trained around a drive sprocket 136 (FIG. 10) and a driven sprocket 138 fixed to the support member 124. Referring to FIG. 10, the lower end of the steering post 34 is provided with a universal joint 140 that couples the steering post 34 to an upright shaft 142. The drive sprocket 136 is keyed to a second, adjacent upright shaft 144, the two shafts 142 and 144 being operably intercoupled by reduction gears 146.

A foot pedal 148 adjacent the floor plate 38 is disposed for actuation by the right foot of the driver. The pedal 148 is in the form of an irregularly shaped rod which is pivoted on a horizontal axis beneath floor plate 38 as illustrated at 150 (FIG. 2). A crank 152 turns on a shaft 154 disposed forwardly of the pedal 148 generally between the two front wheel units 24 and 26. A link 156 joins the lower end of the pedal rod 148 to the crank 152, the latter being connected by an upright arm 158 to a second crank 160. A connecting rod 162 connects the crank 160 to a belt tightener comprising a swingable arm 164 which carries an idler pulley 166 that rides on belt 116. A spring 168 is connected to the arm 164 and normally takes up the slack in the belt 116 to hold the latter tight as clearly illustrated in FIG. 1. When it is desired to uncouple the rear wheel unit 22 from the drive, the pedal 148 is depressed to rotate crank 152 in a clockwise direction (as viewed in FIG. 2) which raises arm 158 to, in turn, rotate crank 160 counterclockwise (as viewed in FIG. 2) against the action of the spring 168. This permits the belt 116 to slacken to thereby remove the power from the rear wheel unit 22.

In order to raise the cutter assembly 48 to an elevated, noncutting position, a winch is provided which is illustrated in detail in FIGS. 6—9. Power to operate the winch is provided by the left-front wheel unit 24, the latter having a friction drive element in the form of a disc 170 rigidly mounted thereon adjacent the inside of the tire in coaxial relationship thereto. The axle 172 interconnecting the two wheel units 24 and 26 extends through a frame member 174 having a arcuate, coaxial flange 176 on its inner face, the flange 176 being greater than semicircular in length. A pair of diametrically opposed depressions 178 in the inner face of frame member 174 within the flange 176 receive a pair of balls 180 trapped in the depressions 178 and a corresponding pair of tear-shaped recesses 182 (FIG. 9) in one face of an activating disc 184 which is received within the flange 176. A radial operating arm 186 is integral with the disc 184 and projects through the opening existing between the ends of the arcuate flange 176. A retaining cap 188 fits over the flange 176 and is held in place on frame member 174 by a pair of integral bolts 190.

A lift drum 192 is rotatably supported on the axle 172 and has an outer face which is provided with high-friction material 194, the latter being closely spaced from the disc 170 as illustrated when the winch is not in operation. A depending leg 196 is swingably mounted in spaced relationship to frame member 174 by a spacer 198 for swinging movement about a horizontal axis defined by the spacer 198 and passing through the upper end of the leg 196. A brake shoe 200 is secured to the upper end of the leg 196 at a point eccentric with respect to the axis of swinging movement of the leg 196, the lower end of the latter being pivotally secured at 214 to a link 202 that joins the lower end of the operating arm 186 to the lower end of an upright lever 204 having a fulcrum at 206 intermediate the ends thereof.

A U-shaped pedal 208 is rigid with the upper end of lever 204 and is disposed for actuation by the heel and toe of the left foot of the operator. A second link 210 is connected to the lever 204 between the pedal 208 and the fulcrum 206 and extends forwardly and downwardly, the forward end thereof being slotted at 212 to receive the pin forming a part of the pivotal connection 214 between the leg 196 and link 202. A return spring 216 has its opposed ends connected to the leg 196 and frame member 174 respectively. A pull line in the form of a chain 218 is connected to the lift drum 192 and extends upwardly therefrom to an extension arm 220 (FIG. 3) that forms a part of one of the link arms of the adjacent parallel linkage 50.

In order to control the cutting height of the cutter assembly 48, the rear roller 54 is vertically adjustable and may be controlled by selectively positioning a handle 222 at the top center of the cutter assembly 48. The handle 222 extends upwardly and forwardly from a rigid connection with a rotatable cross shaft 224 to which a pair of rearwardly extending crank arms 226 are fixed at respective ends of the shaft 224. The outer end of each crank arm 226 is pivotally connected to an irregularly shaped, depending leg 228, the corresponding end of the axle of the rear roller 54 being rotatably attached to the lower end of such leg 228. The two legs 228 are stabilized and yet permitted to move upwardly or downwardly in unison by a pair of links 230 pivotally carried by the cutter assembly 48 and pivotally joined to corresponding legs 228.

OPERATION

Neither of the two front wheel units 24 and 26 is either steered or driven, but the single rear wheel unit 22 is both driven and steerable through 360° by virtue of the drive and steering coupling arrangement illustrated most clearly in FIG. 4 and described in detail above. Power to the two wheels of the rear unit 22 and steering of the unit 22 are both effected along the same vertical axis defined by the coaxial shaft 126 and tubular support member 124. It may be appreciated that, as the steering post 34 is rotated by manipulating the handlebar 32, the chain 134 rotates the sprocket 138 to shift the entire unit 22 about the mentioned axis. While this is being accomplished in normal use of the mower, rotation of the driven pulley 118, and hence the shaft 126, occurs to transfer the drive to the unit 22 regardless of the angular position of the wheel unit 22. Therefore, maximum maneuverability and flexibility in the operation of the mower is provided by the 360° degree steering arrangement, in conjunction with the clutch pedal 148 which is operated to remove power from the rear wheel unit 22 during tight maneuvers when it is desired to make a substantial change in the angular position of wheel unit 22 without advancing forwardly. It is to be understood, of course, that brake and throttle controls (not shown) would also be provided.

At the end of a pass or a number of passes when a load of clippings has accumulated in the catcher 56, the latter may be emptied without the necessity of removing the catcher from the frame of the mower. This is accomplished by pulling the handle 92 to withdraw the rope 80 from the right end of the catcher 56 (as viewed in FIG. 5), initial movement of the rope 80 causing the gate 66 to swing open as the pulley 88 is drawn to the left toward the pulley 90, thus the gate 66, arm 96 and pulley 88 all move together in a counterclockwise direction (FIG. 5) about the horizontal, fore-and-aft axis defined by the hinge 68. The gate 66 ultimately assumes a wide open, horizontal position with the long, vertical leg of arm 96 shifted to a horizontal position above the catcher 56. Continued pulling of the rope 80 advances the pusher plate 72 completely along the length of the catcher 56 from left to right as viewed in FIG. 5, the pusher plate 72 ultimately assuming a fully operated position proximal to the discharge opening 64. Therefore, the load of clippings within the catcher 56 is pushed therefrom through the opening 64 and deposited on the ground at the side of the mower. Upon release of the handle 92, the rope 80 and associated movable components return to the positions thereof illustrated in the drawings by virtue of the action of the return spring 85. When the pusher plate 72 is in its fully operated position, the return spring 85 is fully extended along the top of the catcher 56, and thus is in sufficient tension to withdraw the rope 80 and retract the pusher plate 72 upon release of the handle 92.

When it is desired to raise the cutter assembly 48 to an elevated position above the grass where cutting is not effected, this is accomplished during forward motion of the mower by depressing pedal 208 with the left heel to cause the lever 204 to swing in a clockwise direction as viewed in FIG. 6, resulting in forward movement of the link 202 (to the left as viewed in FIG. 6). The disc 184 and associated operating arm 186 serve as a lift activator, forward motion of the link 202 as just discussed causing clockwise rotation of the disc 184 (as viewed in FIG. 8) to force the balls 180 into the restricted portions of the teardrop-shaped recesses 182. This effects axial shifting of the disc 184 away from the frame member 174 by a camming action of the balls 180 as they are forced into the restricted portions of the recesses 182. Thus, the lift drum 192 is, in turn, shifted axially toward the wheel unit 24 to bring the high-friction material 194 on its outer face into engagement with the rotating friction drive disc 170. This causes the drum 192 to rotate with the wheel to, in turn, partially wind the chain 218 upon the surface of the drum 192. This pulls downwardly on the chain 218 to, in turn, raise the cutter assembly 48. To hold the assembly 48 in its elevated position, the pedal 208 is then depressed utilizing the toe of the left foot in order to swing the lever 204 in the opposite, counterclockwise direction. This swings leg 196 in a counterclockwise direction to, in turn, force the eccentric brake shoe 200 into tight engagement with the surface of the lift drum 192. The chain 218 does not interfere with the contact of the brake shoe 200 with the drum 192 since only about one-half of a revolution of the drum 192 is required to fully elevate the cutter assembly 48. To return the assembly 48 to its lower, operative position, the operator merely removes his foot from the pedal 208 to release the brake shoe 200.

Having thus described the invention, what I claim as new and desire to be secured by Letters Patent is:

1. Mowing apparatus comprising:
a pair of ground-engaging front wheel units and a ground-engaging rear wheel unit presenting a tricycle gear;
a main frame carried by said front and rear wheel units for movement over the ground and unsupported between said front and rear wheel units;
means mounting said front wheel units in laterally spaced relationship with respect to the normal direction of forward movement of said frame for free rotative movement about axes extending generally horizontally transversely of said direction;
means supporting said frame on said rear wheel unit for angular movement of said rear unit with respect to said frame about an upright axis through 360° of rotation;
steering means on said frame coupled with said rear unit for controlling the angular position thereof,
said rear unit having a pair of relatively closely spaced wheels and a differential interconnecting the wheels;
a prime mover mounted on said frame and stationary therewith;
transmission means operably coupling said prime mover with said differential for driving the rear wheels irrespective of the angular position thereof assumed as the mowing apparatus is steered, whereby said rear unit is both steerable through 360° and driven;
cutter means on said frame spaced ahead of said front wheel units and movable with said frame over the ground,
said cutter means including a reel having an axis of rotation extending generally horizontally across the front of the frame transversely of said direction; and
drive means operably coupling said prime mover with said reel for rotating the latter independently of movement of the mowing apparatus over the ground.

2. Apparatus as claimed in claim 1,
said supporting means including a rotatable support member defining said upright axis and joined to said rear unit for said angular movement thereof with said support member,
said transmission means including a rotatable drive component operably coupled with said rear unit and coaxial with said support member.

3. Apparatus as claimed in claim 2,
said steering means being connected to said support member for rotating the latter about said upright axis to, in turn, steer said rear unit.

4. Apparatus as claimed in claim 1,
said supporting means including a rotatable, tubular support member defining said upright axis and joined to said rear unit for said angular movement thereof with said support member,
said transmission means including a rotatable shaft coaxially telescoped within said support member and operably coupled with said rear unit,
said steering means being connected to said support member for rotating the latter about said upright axis independently of said shaft to, in turn, steer said rear unit.

5. Apparatus as claimed in claim 4,
said steering means including a rotatable steering post mounted on said frame, a pair of rotatable devices coupled with said post and said support member respectively, and a flexible, endless member trained around said devices to rotate said support member as the steering post is rotated.

6. Apparatus as claimed in claim 5,
said transmission means further including a rotatable element coupled with said shaft, and a second flexible, endless member operably coupled with said prime mover and trained around said element to drive said shaft.

7. Mowing apparatus comprising:
a plurality of ground-engaging wheel units;
a main frame carried by said wheel units for movement over the ground;
means supporting said frame on one of said wheel units for angular movement of said one unit about an upright axis through 360° of rotation;
steering means on said frame coupled with said one unit for controlling the angular position thereof;
a prime mover mounted on said frame and stationary therewith;
transmission means operably coupling said prime mover with said one unit to drive the latter, whereby said one unit is both steerable through 360° and driven;
cutter means on said frame movable therewith over the ground;
means mounting said cutter means on said frame for upward movement of the cutter means away from the ground to an elevated position; and
winch structure coupled with said cutter means for raising the latter to said elevated position, including a friction drive element rotatable with a particular wheel unit, a rotatable lift drum coaxial with said particular wheel unit and axially shiftable toward and away from said element, a pull line connecting said drum to said cutter means, and means for shifting said drum toward said element and into frictional engagement therewith to cause the drum to rotate with said particular unit and thereby raise the cutter means to its elevated position.

8. Apparatus as claimed in claim 7;
a brake shoe movable into frictional engagement with said drum upon movement of the latter away from said element and out of engagement therewith to hold the drum against return rotation and thereby maintain the cutter means in its elevated position.